United States Patent
Naito (10) Patent No.: US 10,572,037 B2
(45) Date of Patent: Feb. 25, 2020

(54) ROTARY DIAL WITH TOUCH PAD INPUT SURFACE AND DIRECTIONAL TILTING OPERATIONS

(71) Applicant: Mitsubishi Electric Corporation, Tokyo (JP)

(72) Inventor: Norihiro Naito, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/062,790

(22) PCT Filed: Feb. 17, 2016

(86) PCT No.: PCT/JP2016/054500
§ 371 (c)(1),
(2) Date: Jun. 15, 2018

(87) PCT Pub. No.: WO2017/141364
PCT Pub. Date: Aug. 24, 2017

(65) Prior Publication Data
US 2018/0373347 A1 Dec. 27, 2018

(51) Int. Cl.
*H01H 25/06* (2006.01)
*G06F 3/038* (2013.01)
(Continued)

(52) U.S. Cl.
CPC ............ *G06F 3/038* (2013.01); *G06F 3/0354* (2013.01); *G06F 3/0362* (2013.01);
(Continued)

(58) Field of Classification Search
CPC .. G06F 3/0362; G06F 3/0488; G06F 3/03547; G06F 3/038; G06F 2203/04106;
(Continued)

(56) References Cited

U.S. PATENT DOCUMENTS 5,270,689 A * 12/1993 Hermann ........... G01C 21/3664
345/157
7,450,108 B2 * 11/2008 Clabunde ............... G05G 9/047
200/18

(Continued)

FOREIGN PATENT DOCUMENTS

| JP | 2007-504625 A | 3/2007 |
| JP | 2010-102516 A | 5/2010 |

(Continued)

OTHER PUBLICATIONS

International Search Report (PCT/ISA/210) issued in PCT/JP2016/054500, dated Mar. 29, 2016.

*Primary Examiner* — Vanessa Girardi
(74) *Attorney, Agent, or Firm* — Birch, Stewart, Kolasch & Birch, LLP (57) ABSTRACT

A operation input device includes a lever and a dial serving as movable operation parts that are moved by a user to be operated, a touch pad through which the user inputs a touch operation, and a braking mechanism for controlling movement of the lever and the dial. The dial is provided on top of the lever, and the touch pad is provided on the dial. The braking mechanism controls movement of the lever and the dial, that is, movement of the position of the touch pad, while a touch operation is performed on the touch pad.

6 Claims, 10 Drawing Sheets

(51) Int. Cl.
 *G06F 3/0362* (2013.01)
 *G06F 3/0354* (2013.01)
 *H01H 3/02* (2006.01)

(52) U.S. Cl.
 CPC ....... *G06F 3/03547* (2013.01); *H01H 25/065* (2013.01); *B60K 2370/145* (2019.05); *H01H 2003/0293* (2013.01); *H01H 2300/024* (2013.01)

(58) Field of Classification Search
 CPC ...... B60K 2350/102; B60K 2350/1024; B60K 2350/104; H01H 2003/028; H01H 2003/0293; H01H 2300/024; H01H 25/065
 See application file for complete search history.

(56) References Cited

U.S. PATENT DOCUMENTS

| | | |
|---|---|---|
| 2007/0159452 A1 | 7/2007 | Basche et al. |
| 2015/0049059 A1* | 2/2015 | Zadesky ............... G06F 1/1613 345/174 |
| 2015/0091881 A1 | 4/2015 | Onaka |
| 2017/0052636 A1 | 2/2017 | Yoshinaka |

FOREIGN PATENT DOCUMENTS

| | | |
|---|---|---|
| JP | 2013-256186 A | 12/2013 |
| JP | 2015-69382 A | 4/2015 |
| WO | 2015/170448 A1 | 11/2015 |

\* cited by examiner

ROTARY DIAL WITH TOUCH PAD INPUT SURFACE AND DIRECTIONAL TILTING OPERATIONS

TECHNICAL FIELD

The present invention relates to an operation input device, and more particularly to an operation input device including both of a movable operation part and a touch pad.

BACKGROUND ART

There is known an operation input device having a structure in which a touch pad is provided on a movable operation part moved by a user to be operated (Patent Documents 1 and 2 below, for example). The area necessary for installation of an operation input device having such a structure suffices to be small, and thus the operation input device is effective for installation to a location where the installable position and area are limited, such as the vicinity of a driver's seat of a vehicle, for example.

PRIOR ART DOCUMENTS

Patent Documents

Patent Document 1: Japanese Translation of PCT International Application Publication No. 2007-504625
Patent Document 2: Japanese Patent Application Laid-Open No. 2010-102516

SUMMARY

Problem to be Solved by the Invention

In an operation input device having a structure in which a touch pad is provided on a movable operation part, the touch pad moves together with the movable operation part, and hence the position of the touch pad is unstable. For example, when the movable operation part is moved by a force of the user operating a touch panel, the position of the touch pad is also moved, and thus an operation thereof may not be properly performed. Further, such movement of the movable operation part due to a force of operating a touch panel may adversely cause an input of an operation not intended by the user (erroneous operation) to the movable operation part. Conversely, an erroneous touch of the user on the touch pad at the time of an operation of the movable operation part may adversely generate an erroneous operation of the touch pad.

The present invention has been made in order to solve the problems as described above, and has an object to prevent an erroneous operation in an operation input device having a touch pad on a movable operation part.

Means to Solve the Problem

An operation input device according to a first aspect of the present invention includes a movable operation part moved by a user to be operated, a touch pad disposed on the movable operation part, through which the user inputs a touch operation, and a braking mechanism for controlling movement of the movable operation part while a touch operation is performed on the touch pad.

An operation input device according to a second aspect of the present invention includes a movable operation part moved by a user to be operated, a touch pad disposed on the movable operation part, through which the user inputs a touch operation, and a touch operation determination part for nullifying a touch operation on the touch pad while a shift operation is performed on the movable operation part.

Effects of the Invention

According to the present invention, movement of the movable operation part at the time of an operation of the touch pad, or detection of an operation of the touch pad at the time of an operation of the movable operation part is prevented, and therefore an operation not intended by the user (erroneous operation) can be prevented.

An object, features, aspects, and advantages of the present invention become more obvious with the following detailed description and the attached drawings.

DESCRIPTION OF EMBODIMENTS

First Embodiment

Figure 1:
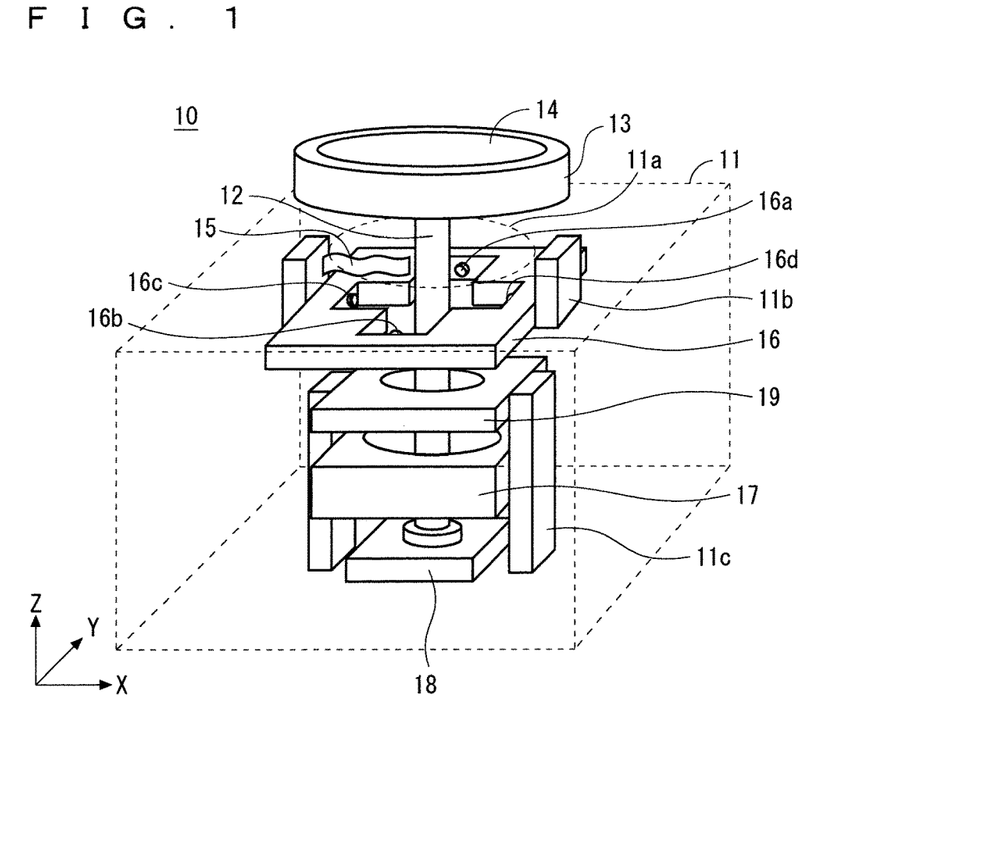
FIG. 1 is a view illustrating a configuration of an operation input device according to a first embodiment.

FIG. 1 is a view illustrating a configuration of an operation input device 10 according to a first embodiment. In FIG. 1, a casing 11 of the operation input device 10 is indicated by the dashed line. An opening 11a is provided in a top plate of the casing 11, and a lever 12 serving as a movable operation part (operation part moved by the user to be operated) projects from the opening 11a. In the lever 12, a dial 13 (knob) serving as a movable operation part is provided on its top. As in FIG. 2, a touch pad 14 is provided in an upper surface of the dial 13. The touch pad 14 is a touch sensor for outputting a signal indicating coordinates (touch coordinates) corresponding to the position where the user touches. Further, the lever 12 has such a configuration as to be capable of being pushed in downward, and the entire lever 12 functions as a push switch as a movable operation part.

Figure 2:
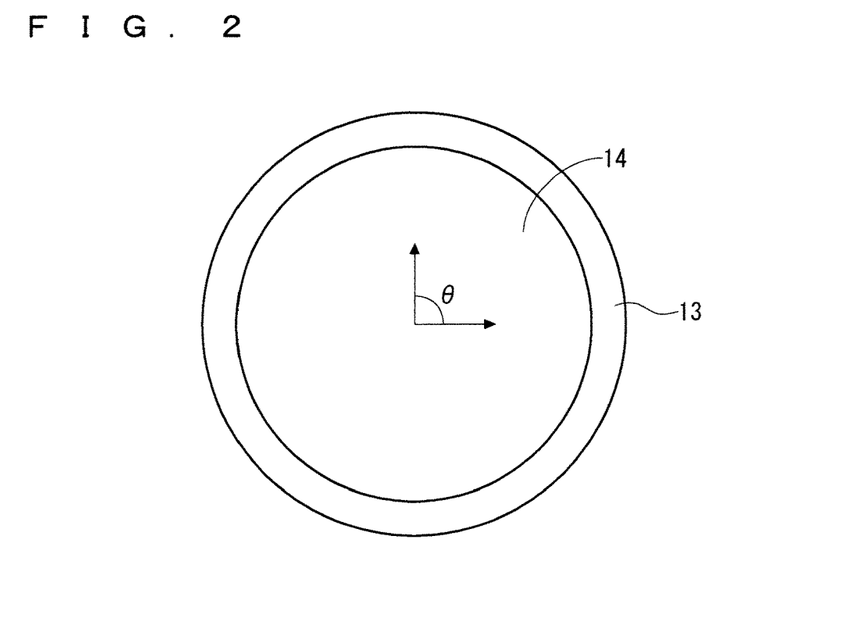
FIG. 2 is a top view of a dial installed with a touch pad.

The user can input various operations by tilting the lever 12, turning the dial 13, pressing down the lever 12, or touching the touch pad 14. Here, the dial 13 is fixed to the lever 12, and the touch pad 14 is fixed to the dial 13. Therefore, when the user turns the dial 13, the entire lever 12 turns, and the touch pad 14 also turns along with such turns.

An operation (including a turn operation) input by moving the movable operation parts such as the lever 12 and the dial 13 is referred to as a "shift operation." On the other hand, an operation input by touching the touch pad 14 is referred to as a "touch operation."

In a lower surface of the top plate of the casing 11, support members 11b for supporting a lever operation detector 16 are provided. Further, in the support member 11b, spring members 15 for generating appropriate reaction at the time when the user moves the lever 12 are provided (although illustration is omitted, the spring member 15 is provided on each of two support members 11b).

The lever operation detector 16 detects a movable operation (direction specifying operation) performed by tilting the lever 12. The lever operation detector 16 includes grooves for restricting movable directions of the lever 12 to be four directions of front, back, right, and left, and four switches for detecting a shift direction in an operation of the lever 12. That is, the lever operation detector 16 includes, on the inner side of the above-mentioned grooves, a forward switch 16a for outputting a signal when the lever 12 is moved forward, a backward switch 16b for outputting a signal when the lever 12 is moved backward, a left switch 16c for outputting a signal when the lever 12 is moved to the left, and a right switch 16d for outputting a signal when the lever 12 is moved to the right. Here, movable directions of the lever 12 are four directions, but such movable directions may be employed as to be capable of specifying eight directions or sixteen directions, for example, or an analog mode allowing omnidirectional movable direction may be employed.

Further, on a bottom plate of the casing 11, bases 11c for supporting a dial turn detector 17 and a braking mechanism 19, and a lever press-down detector 18 are provided. The dial turn detector 17 detects a movable operation (turn operation) performed by turning the dial 13. The dial turn detector 17 detects a turn of the dial 13, i.e., a turn of a shaft of the lever 12, and outputs a signal corresponding to a turning degree and a turning direction thereof (right turn or left turn). The lever press-down detector 18 detects a movable operation (press-down operation) performed by pressing down the lever 12. The lever press-down detector 18 is a switch for detecting a press-down (downward shift) on the lever 12, and outputs a signal when the lever 12 is pressed down.

Further, the braking mechanism 19 controls movement of the lever 12 and the dial 13 serving as movable operation parts so that the lever 12 and the dial 13 are not moved easily while the user performs a touch operation on the touch pad 14. It is ideal that the braking mechanism 19 be capable of completely fixing the lever 12 and the dial 13.

Figure 3:
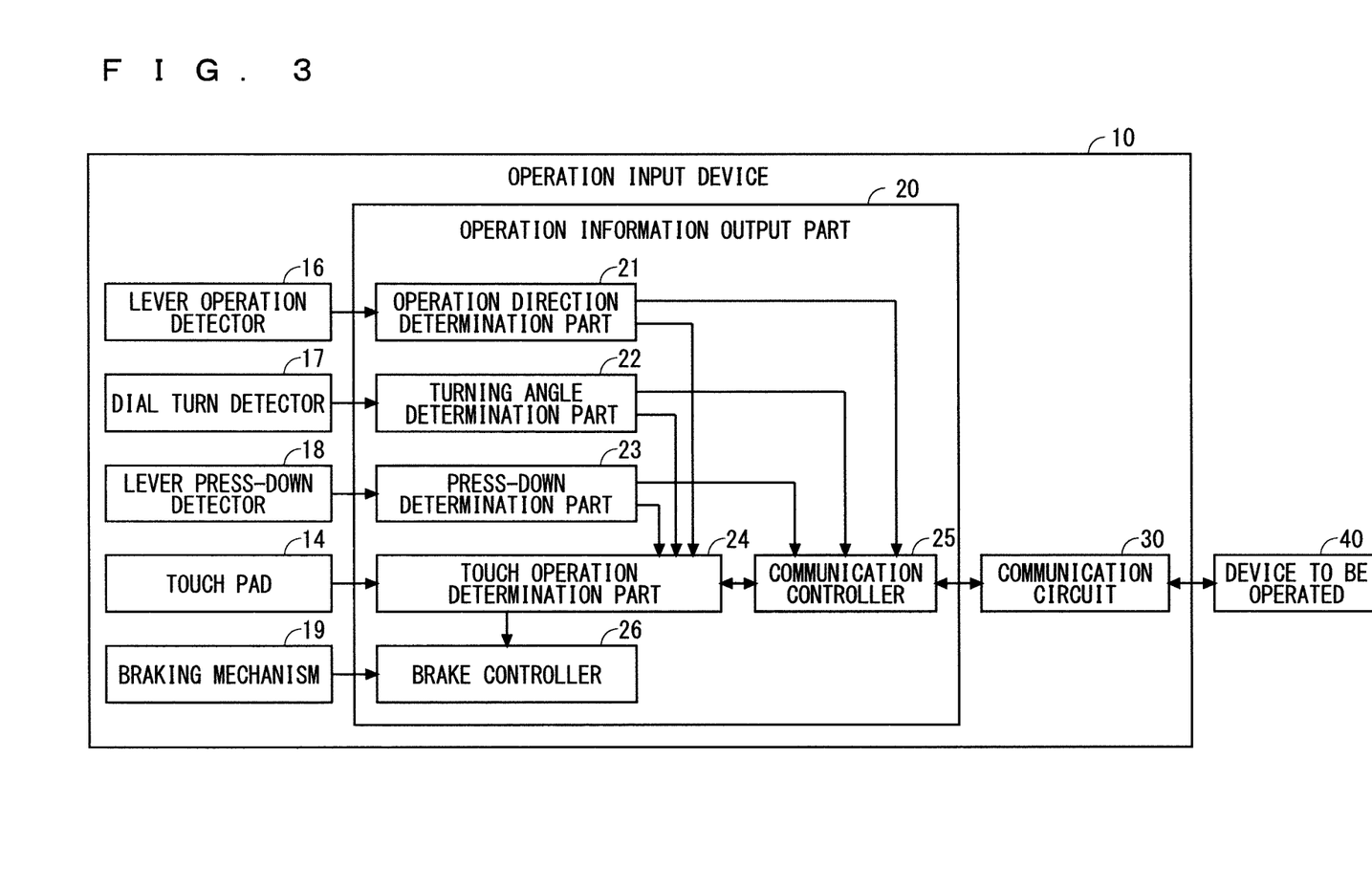
FIG. 3 is a diagram illustrating a configuration of an operation information output part of the operation input device according to the first embodiment.

Although illustration is omitted in FIG. 1, the operation input device 10 includes, as in FIG. 3, an operation information output part 20 for outputting information (operation information) indicating details of an operation input by the user, and a communication circuit 30 for transmitting the operation information output by the operation information output part 20 to a device 40 to be operated (device to be operated). The touch pad 14, the lever operation detector 16, the dial turn detector 17, the lever press-down detector 18, and the braking mechanism 19 that are illustrated in FIG. 3 correspond to the respective components illustrated in FIG. 1.

The device to be operated 40 operates in accordance with the operation information transmitted from the operation input device 10, i.e., information indicating details of the user operation. Therefore, the user can operate the device to be operated 40 using the operation input device 10. There is no limitation to the types of the device to be operated 40. For example, in a case where the operation input device 10 is installed in a vehicle, a car navigation device, an on-board display audio system, or the like is conceivable as the device to be operated 40.

As in FIG. 3, the operation information output part 20 includes an operation direction determination part 21, a turning angle determination part 22, a press-down determination part 23, a touch operation determination part 24, a communication controller 25, and a brake controller 26.

The operation direction determination part 21 generates, based on an output signal of the four switches (forward switch 16a, backward switch 16b, left switch 16c, and right switch 16d) of the lever operation detector 16, operation information indicating a moved direction (operation direction) of the lever 12. The turning angle determination part 22 generates, based on an output signal of the dial turn detector 17, operation information indicating a turning angle (θ illustrated in FIG. 2) of the dial 13 and a turning direction thereof. The press-down determination part 23 generates, based on an output signal of the lever press-down detector 18, operation information indicating whether the lever 12 has been pressed down as a push switch.

The touch operation determination part 24 analyzes, based on an output signal of the touch pad 14, the position (touch coordinates) of a touch operation of the user and movement (trace) thereof to generate operation information indicating details of a touch operation. As the details of touch operations, for example, there are "tapping" in which a single position is touched, "swiping," "dragging," and "flicking," in which change in a touched position is involved, "pinching" and "rotating" in which a plurality of positions are touched, and the like. Note that, in this embodiment, the orientation of the touch pad 14 is changed as the dial 13 is turned, and hence the orientation of the touch pad 14 is not fixed. Therefore, the touch operation determination part 24 determines, based on operation information of the dial 13 output by the turning angle determination part 22, the current orientation of the touch pad 14, and then corrects the touch coordinates in accordance with the orientation.

The communication controller 25 transmits various pieces of operation information output by the operation direction determination part 21, the turning angle determination part 22, the press-down determination part 23, and the touch operation determination part 24 to the device to be operated 40 using the communication circuit 30.

The brake controller 26 monitors whether an operation (touch operation) of the touch pad 14 is detected in the touch operation determination part 24, and activates the braking mechanism 19 to control the movement of the lever 12 and the dial 13 serving as movable operation parts while a touch operation is detected.

Figure 4:
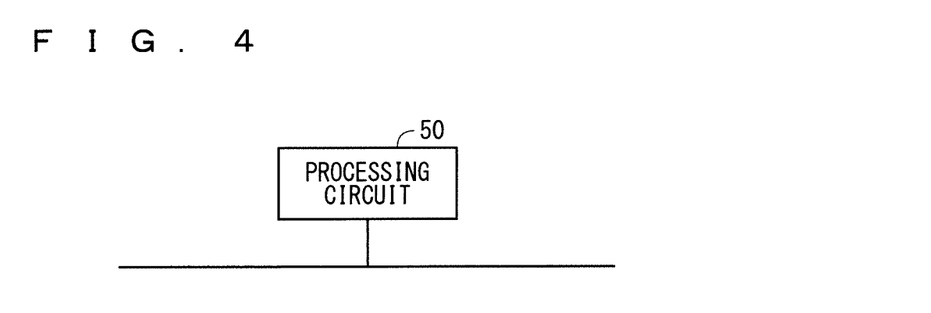
FIG. 4 is a diagram illustrating an example of a hardware configuration of the operation information output part.
Figure 5:
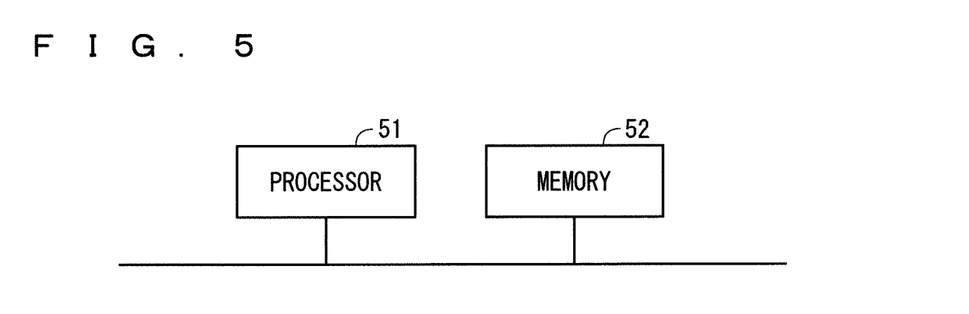
FIG. 5 is a diagram illustrating an example of a hardware configuration of the operation information output part.

FIG. 4 and FIG. 5 are each a diagram illustrating an example of a hardware configuration of the operation information output part 20. Each of the components of the operation information output part 20 illustrated in FIG. 1

(operation direction determination part 21, turning angle determination part 22, press-down determination part 23, touch operation determination part 24, communication controller 25, and brake controller 26) is realized by a processing circuit 50 illustrated in FIG. 4, for example. That is, the processing circuit 50 includes the operation direction determination part 21 for generating operation information of the lever 12, the turning angle determination part 22 for generating operation information of the dial 13, the press-down determination part 23 for generating operation information of the lever 12, the touch operation determination part 24 for generating operation information of the touch pad 14, the communication controller 25 for transmitting each piece of the above-mentioned operation information using the communication circuit 30, and the brake controller 26 for activating the braking mechanism 19 to control movement of the lever 12 and the dial 13 while an operation of the touch pad 14 is detected by the touch operation determination part 24. Dedicated hardware may be applied to the processing circuit 50, or a processor (a central processing unit, a central processor, a processing unit, an arithmetic unit, a microprocessor, a microcomputer, or a digital signal processor) for executing a program stored in memory may be applied thereto.

In a case where the processing circuit 50 is dedicated hardware, as the processing circuit 50, for example, a single circuit, a composite circuit, a programmed processor, a processor for a parallel program, an ASIC, an FPGA, a combination thereof, or the like is applicable. Each function of each of the components of the operation information output part 20 may be realized by a plurality of processing circuits 50, or such functions may be realized altogether by a single processing circuit 50.

FIG. 5 is an illustration of a hardware configuration of the operation information output part 20 in a case where the processing circuit 50 is configured with use of a processor. In this case, the function of each of the components of the operation information output part 20 is realized by a combination with software or the like (software, firmware, or software and firmware). Software or the like is described as a program, and is stored in memory 52. A processor 51 as the processing circuit 50 realizes the function of each part by reading out and executing a program stored in the memory 52. That is, at the time of the execution performed by the processing circuit 50, the operation information output part 20 includes the memory 52 for storing a program to eventually execute a step of generating operation information of the lever 12, a step of generating operation information of the dial 13, a step of generating operation information of the lever 12, a step of generating operation information of the touch pad 14, a step of transmitting each piece of the above-mentioned operation information using the communication circuit 30, and a step of controlling movement of the lever 12 and the dial 13 while an operation of the touch pad 14 is detected. In other words, it can be said that the program makes a computer execute a procedure or a method of an operation of each of the components of the operation information output part 20.

Here, as the memory 52, for example, non-volatile or volatile semiconductor memory such as random access memory (RAM), read only memory (ROM), flash memory, erasable programmable read only memory (EPROM), and electrically erasable programmable read only memory (EEPROM), a hard disk drive (HDD), a magnetic disk, a flexible disk, an optical disc, a compact disc, a MiniDisc, a digital versatile disc (DVD), a drive device thereof, or the like is applicable.

In the above, description has been given of a configuration in which the function of each of the components of the operation information output part 20 is realized by any one of hardware, software, and the like. However, the configuration is not limited thereto, and such a configuration may be employed that a part of the components of the operation information output part 20 is realized by dedicated hardware and another part of the component is realized by software or the like. For example, functions of a part of the components may be realized by the processing circuit 50 as dedicated hardware, and functions of another part of the components may be realized in such a manner that the processing circuit 50 as the processor 51 reads out and executes a program stored in the memory 52.

As described above, the processing circuit 50 can realize each function described above with hardware, software, a combination thereof, or the like.

Now, an operation of each of the components of the operation information output part 20 is specifically described.

Figure 6:
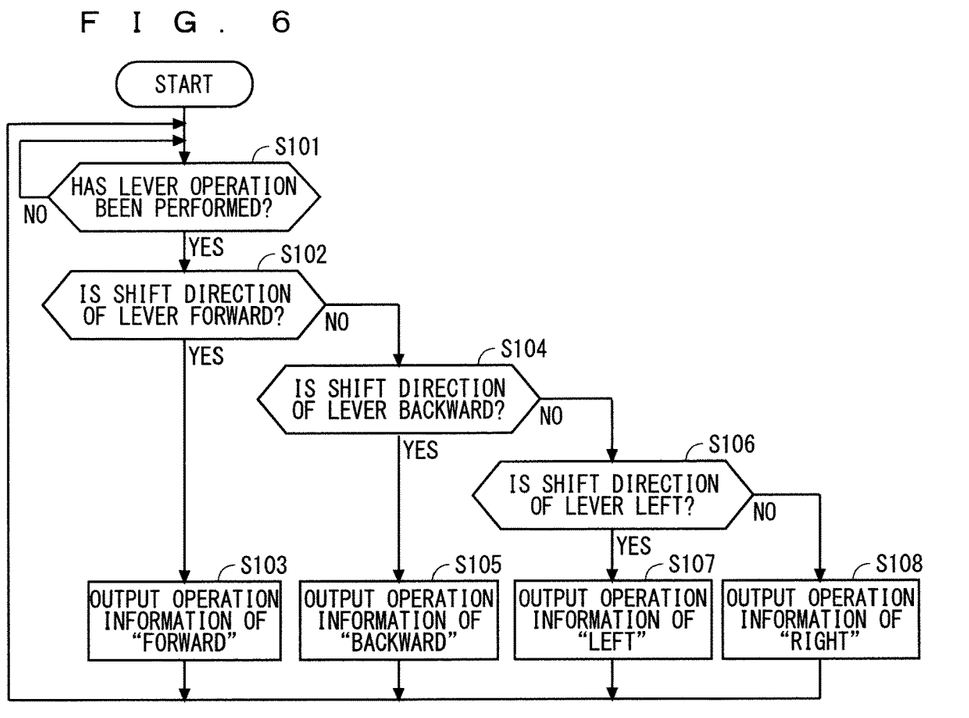
FIG. 6 is a flowchart illustrating an operation of an operation direction determination part.

FIG. 6 is a flowchart illustrating an operation of the operation direction determination part 21. The operation direction determination part 21 confirms, based on an output signal of the lever operation detector 16, whether or not an operation (denoting a direction specifying operation, excluding a press-down operation) of the lever 12 has been performed (Step S101). The operation direction determination part 21 stands by while the lever 12 is not operated (NO in Step S101), and when the lever 12 is operated (YES in Step S101), the operation direction determination part 21 performs the following processing.

That is, when the lever 12 is operated, the operation direction determination part 21 confirms whether a shift direction (operation direction) of the lever 12 due to the operation is forward (Step S102). When the operation direction is forward (YES in Step S102), operation information of "forward" is output (Step S103). When the operation direction is not forward (NO in Step S102), whether the operation direction is backward is confirmed (Step S104). When the operation direction is backward (YES in Step S104), operation information of "backward" is output (Step S105). When the operation direction is not backward (NO in Step S104), whether the operation direction is left is confirmed (Step S106). When the operation direction is left (YES in Step S106), operation information of "left" is output (Step S107). When the operation direction is not left (NO in Step S106), operation information of "right" is output (Step S108). After that, the processing returns to Step S101.

Figure 7:
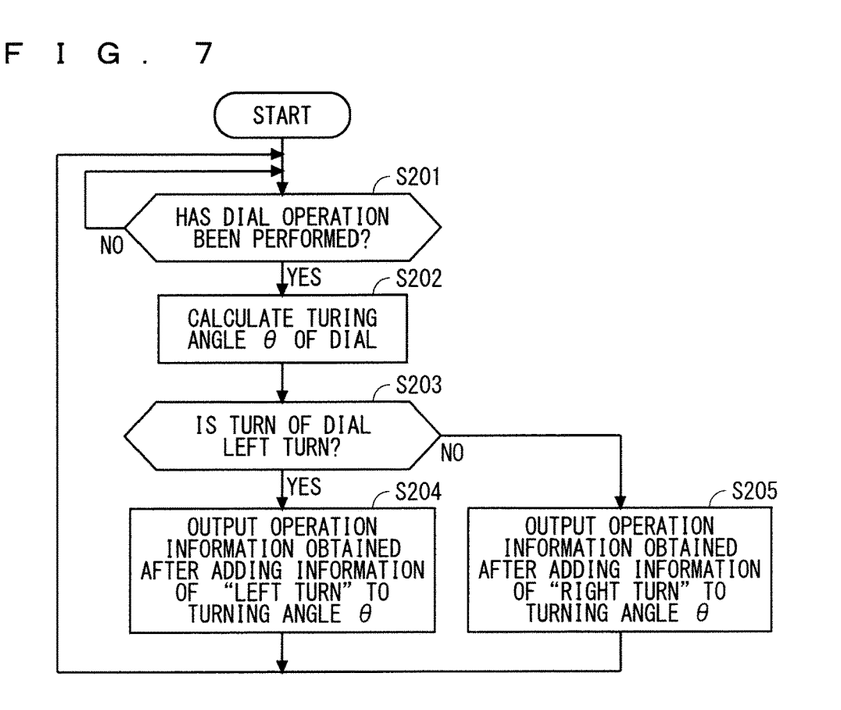
FIG. 7 is a flowchart illustrating an operation of a turning angle determination part.

FIG. 7 is a flowchart illustrating an operation of the turning angle determination part 22. The turning angle determination part 22 confirms, based on an output signal of the dial turn detector 17, whether or not an operation (turn operation) of the dial 13 has been performed (Step S201). The turning angle determination part 22 stands by while the dial 13 is not operated (NO in Step S201), and when the dial 13 is operated (YES in Step S201), the turning angle determination part 22 performs the following processing.

That is, when the dial 13 is operated, the turning angle determination part 22 calculates the turning angle θ of the dial 13 generated due to the operation (Step S202). Next, the turning angle determination part 22 confirms whether the turn of the dial 13 is a left turn (Step S203). When the turn of the dial 13 is a left turn (YES in Step S203), operation information obtained after adding information of "left turn" to the turning angle θ is output (Step S204). When the turn of the dial 13 is not a left turn (NO in Step S203), operation information obtained after adding information of "right turn" to the turning angle θ is output (Step S205). After that, the processing returns to Step S201.

Figure 8:
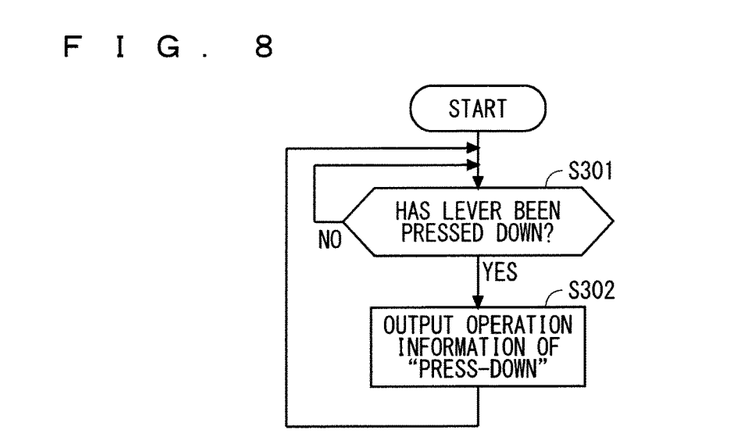
FIG. 8 is a flowchart illustrating an operation of a press-down determination part.

FIG. 8 is a flowchart illustrating an operation of the press-down determination part 23. The press-down determination part 23 confirms, based on an output signal of the lever press-down detector 18, whether a press-down (press-down operation) on the lever 12 has been performed (Step S301). The press-down determination part 23 stands by while the lever 12 is not pressed down (NO in Step S301), and when the lever 12 is pressed down (YES in Step S301), the press-down determination part 23 outputs operation information of "press-down" (Step S302). After that, the processing returns to Step S301.

Figure 9:
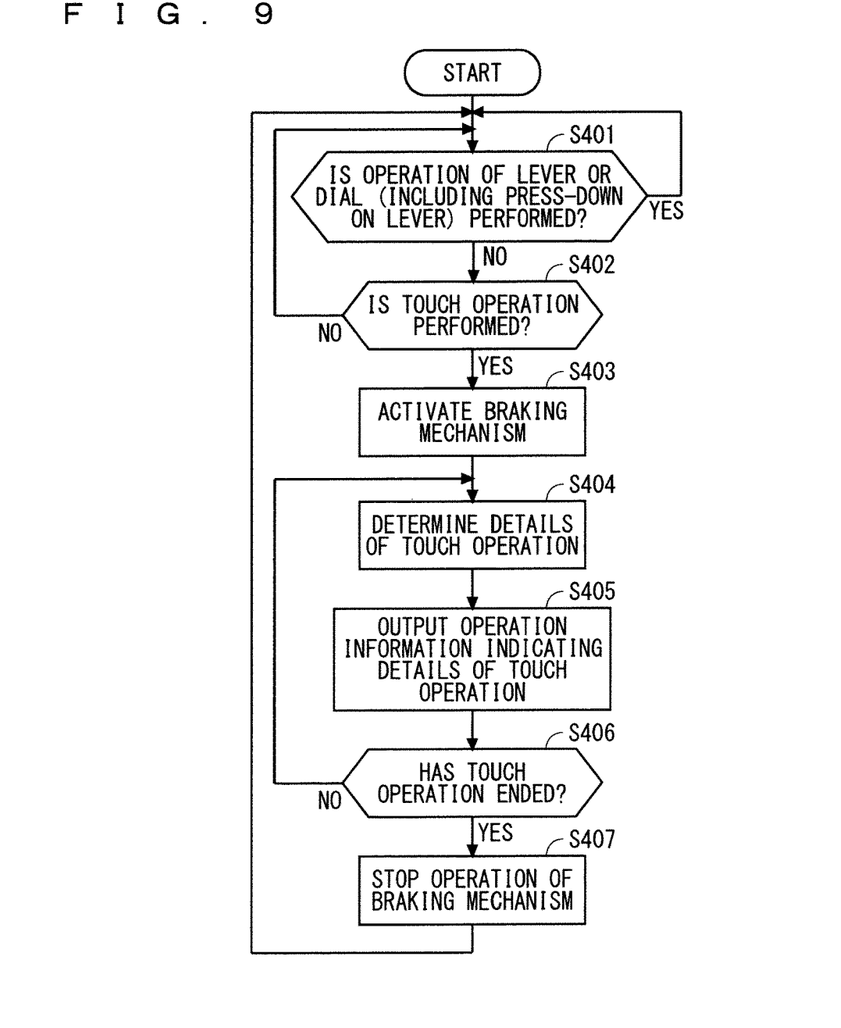
FIG. 9 is a flowchart illustrating an operation of a touch operation determination part and a brake controller.

FIG. 9 is a flowchart illustrating an operation of the touch operation determination part 24 and the brake controller 26. The touch operation determination part 24 monitors operations of the operation direction determination part 21, the turning angle determination part 22, and the press-down determination part 23 to confirm whether or not an operation of the lever 12 or the dial 13 serving as a movable operation part is performed (Step S401). Specifically, whether an operation (direction specifying operation) of the lever 12 is detected by the operation direction determination part 21, whether an operation (turn operation) of the dial 13 is detected by the turning angle determination part 22, and whether a press-down (press-down operation) on the lever 12 is detected by the press-down determination part 23 are confirmed (Step S401).

The touch operation determination part 24 stands by while either of the lever 12 or the dial 13 is operated (YES in Step S401). That is, a touch operation performed on the touch pad 14 while the lever 12 or the dial 13 is operated is ignored (nullified). A touch operation input to the touch pad 14 during an operation of the lever 12 or the dial 13 is likely to be an erroneous operation due to an erroneous touch of the user on the touch pad 14, and hence an erroneous operation of such a kind is prevented by the processing in Step S401.

When neither of the lever 12 nor the dial 13 is operated (NO in Step S401), the touch operation determination part 24 confirms, based on an output signal of the touch pad 14, whether an operation (touch operation) of the touch pad 14 is performed (Step S402). When the touch pad 14 is not operated (NO in Step S402), the processing returns to Step S401, but when the touch pad 14 is operated (YES in Step S402), the following processing is performed.

Firstly, the brake controller 26 activates the braking mechanism 19 to control movement of the lever 12 and the dial 13 (Step S403). With this, positional change of the touch pad 14 is controlled, enabling the user to stably perform a touch operation. The touch operation determination part 24 analyzes an output signal of the touch pad 14 to determine details of a touch operation (Step S404), and then outputs operation information indicating the details of the touch operation (Step S405). The processing in Steps S404 and S405 is repeatedly performed until a touch operation ends (Step S406). With this, touch operations such as "dragging" and "pinching" that use the trace of the touch coordinates can also be handled. Note that, as for a method of determining the end of a touch operation, for example, the touch operation may be determined to have ended when the touch coordinates are no longer detected or when the touch coordinates are not moved for a predetermined time period or more.

When an operation of the user on the touch pad 14 ends, the touch operation determination part 24 stops the operation of the braking mechanism 19, and releases the lever 12 and the dial 13 (Step S407). Then, the processing returns to Step S401.

As described above, according to the operation input device 10 of this embodiment, the braking mechanism 19 controls the movement of the lever 12 and the dial 13 while the touch pad 14 is operated by the user, and hence the position of the touch pad 14 is stabilized to enable prevention of an erroneous operation of the touch pad 14. Further, an erroneous operation due to an erroneous touch of the user on the touch pad 14 during an operation of the lever 12 or the dial 13 can be prevented because the touch operation determination part 24 nullifies the operation of the touch pad 14 while the lever 12 or the dial 13 is operated.

Note that, in this embodiment, the brake controller 26 activates the braking mechanism 19 after an operation of the touch pad 14 is detected, but may anticipate an operation of the touch pad 14 based on an operation state of the device to be operated 40 to activate the braking mechanism 19 before the touch pad 14 is operated. Fixing the position of the touch pad 14 before a touch operation is performed enables a more stable touch operation. For example, when the device to be operated 40 displays an input screen for accepting only touch operations (input screen for handwriting letters, for example), a subsequent operation of the touch pad 14 can be anticipated.

Next, a configuration example of the braking mechanism 19 is described. The braking mechanism 19 may be realized by a mechanism of tightly pressing the shaft of the lever 12 with brake pads from the outside as in a drum brake of a motor vehicle, for example. The brake pads are made so as to retreat and stand by at the position not obstructing the movement of the lever 12 when the braking mechanism 19 is turned off.

Figure 10:
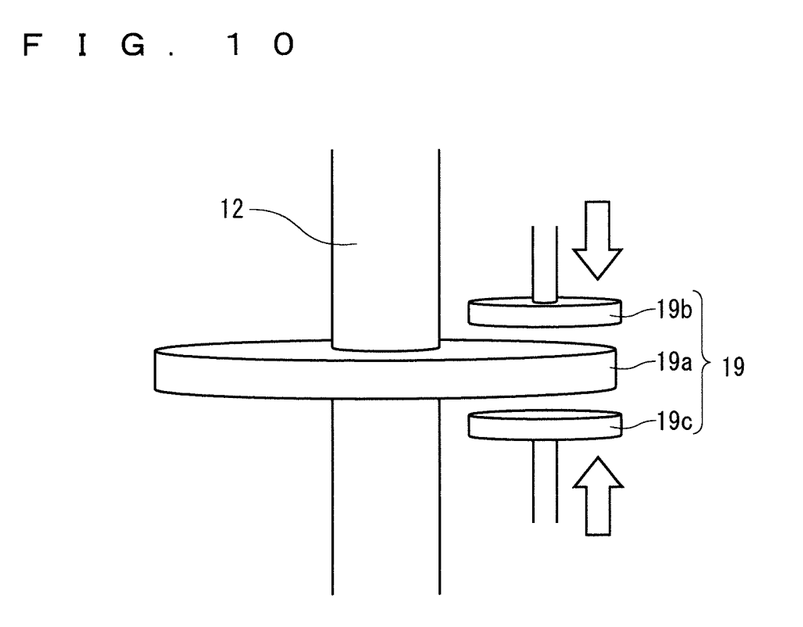
FIG. 10 is a view illustrating a configuration example of a braking mechanism.

Further, as in FIG. 10, the braking mechanism 19 may be a caliper brake type formed of a brake disc 19a provided on the lever 12 and brake pads 19b and 19c sandwiching the brake disc 19a from upper and lower sides. When the braking mechanism 19 is turned off, the brake pads 19b and 19c retreat and stand by at the position not coming into contact with the brake disc 19a even if the lever 12 moves. Further, when the braking mechanism 19 is turned on, the brake pads 19b and 19c control the movement of the lever 12 and the dial 13 by sandwiching the brake disc 19a. In particular, owing to the presence of the brake pad 19c on the lower side, there is attained an advantage of being capable of securely preventing a press-down on the lever 12.

Second Embodiment

Figure 11:
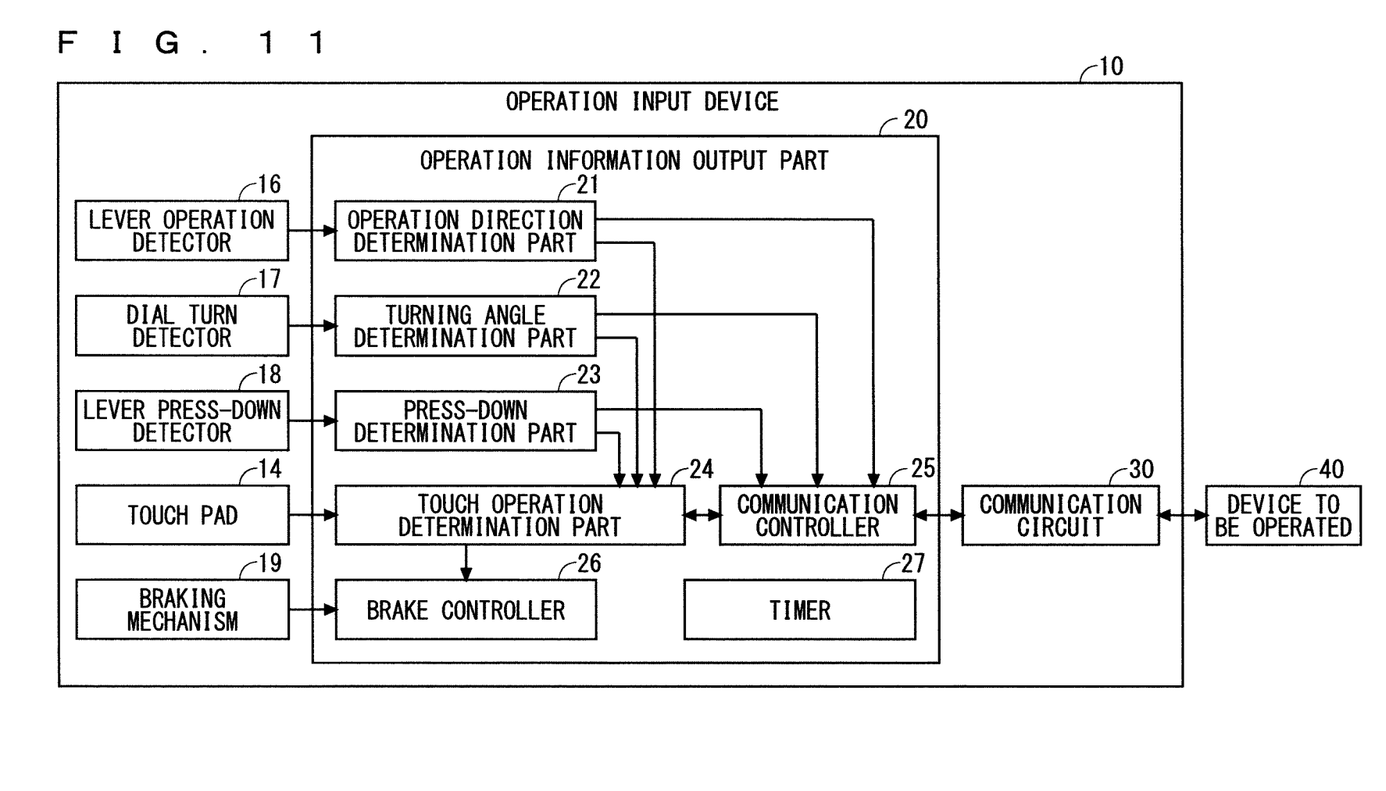
FIG. 11 is a diagram illustrating a configuration of the operation information output part of the operation input device according to a second embodiment.

FIG. 11 is a diagram illustrating a configuration of the operation information output part 20 in the operation input device 10 according to a second embodiment. In the operation information output part 20, a timer 27 for counting time is added to the configuration of the first embodiment.

In the second embodiment, the operation direction determination part 21, the turning angle determination part 22, and the press-down determination part 23 of the operation information output part 20 measure, based on the counting of the timer 27, time from the beginning of an operation of the lever 12 or the dial 13, and determine that the lever 12 or the dial 13 has been operated only when the time exceeds a predetermined threshold value.

For example, in Step S101 of FIG. 6, when the operation direction determination part 21 continuously receives a signal for 50 msec or more from the switch of the lever operation detector 16 (either of forward switch 16a, backward switch 16b, left switch 16c, and right switch 16d), the operation direction determination part 21 determines that the lever 12 has been operated (YES in Step S101). Further, in Step S201 of FIG. 7, when the turning angle determination part 22 continuously receives a signal for 50 msec or more from the dial turn detector 17, the turning angle determination part 22 determines that the dial 13 has been operated (YES in Step S201). Similarly, in Step S301 of FIG. 8, when the press-down determination part 23 continuously receives a signal for 50 msec or more from the lever press-down detector 18, the press-down determination part 23 determines that the lever 12 has been pressed down (YES in Step S301).

An extremely short-period operational input is likely to be an operational input due to an erroneous operation, and hence only an operational input of a certain period or more is accepted, thereby being capable of obtaining such an effect as to enable prevention of an erroneous operation. Further, an erroneous operation of the operation input device 10 due to the influence of the noise can also be prevented.

Note that, the above-mentioned threshold value (50 msec) is merely an example, and an arbitrary value may be employed. Further, each of the operation direction determination part 21, the turning angle determination part 22, and the press-down determination part 23 may have a threshold value different from one another.

The timer 27 may be used for a purpose other than determination of an erroneous operation. For example, in the press-down determination part 23, the time length in which a signal is output from the lever press-down detector 18 may be measured so as to distinguish a usual press-down operation and a long press operation of the lever 12.

Third Embodiment

Figure 12:
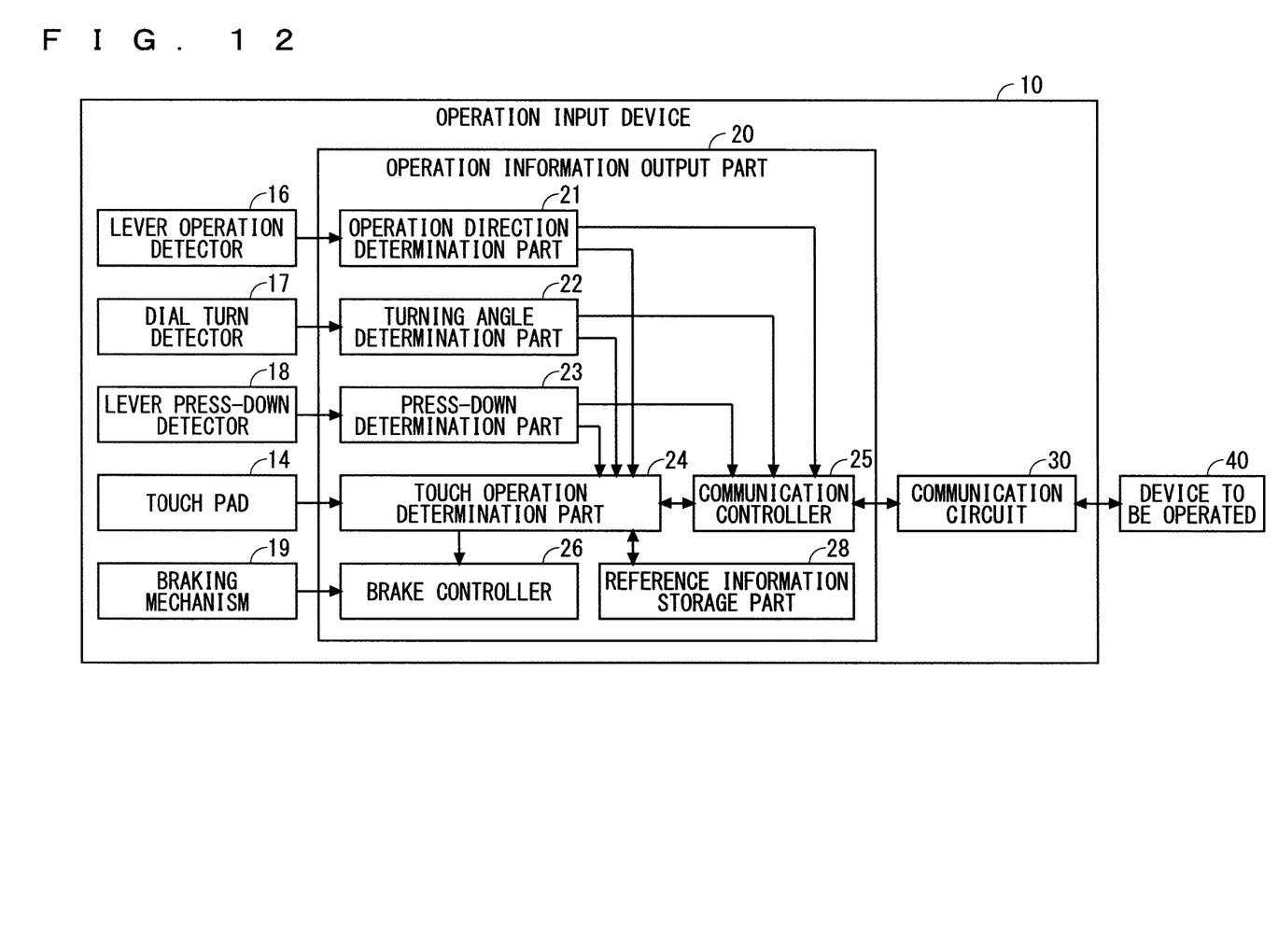
FIG. 12 is a diagram illustrating a configuration of the operation information output part of the operation input device according to a third embodiment.

FIG. 12 is a diagram illustrating a configuration of the operation information output part 20 in the operation input device 10 according to a third embodiment. In the operation information output part 20, a reference information storage part 28 is added to the configuration of the first embodiment.

In the reference information storage part 28, information of an operation pattern (reference pattern) to serve as a basis for determining details of a touch operation is stored. Through comparison between an operation pattern obtained by the trace of the touch coordinates acquired from the touch pad 14 and a reference pattern, the touch operation determination part 24 can determine more complicated operation details. For example, the operation input device 10 can recognize letters by making a reference pattern contain letter patterns, which enables the user to input handwriting letters using the touch pad 14.

Fourth Embodiment

Figure 13:
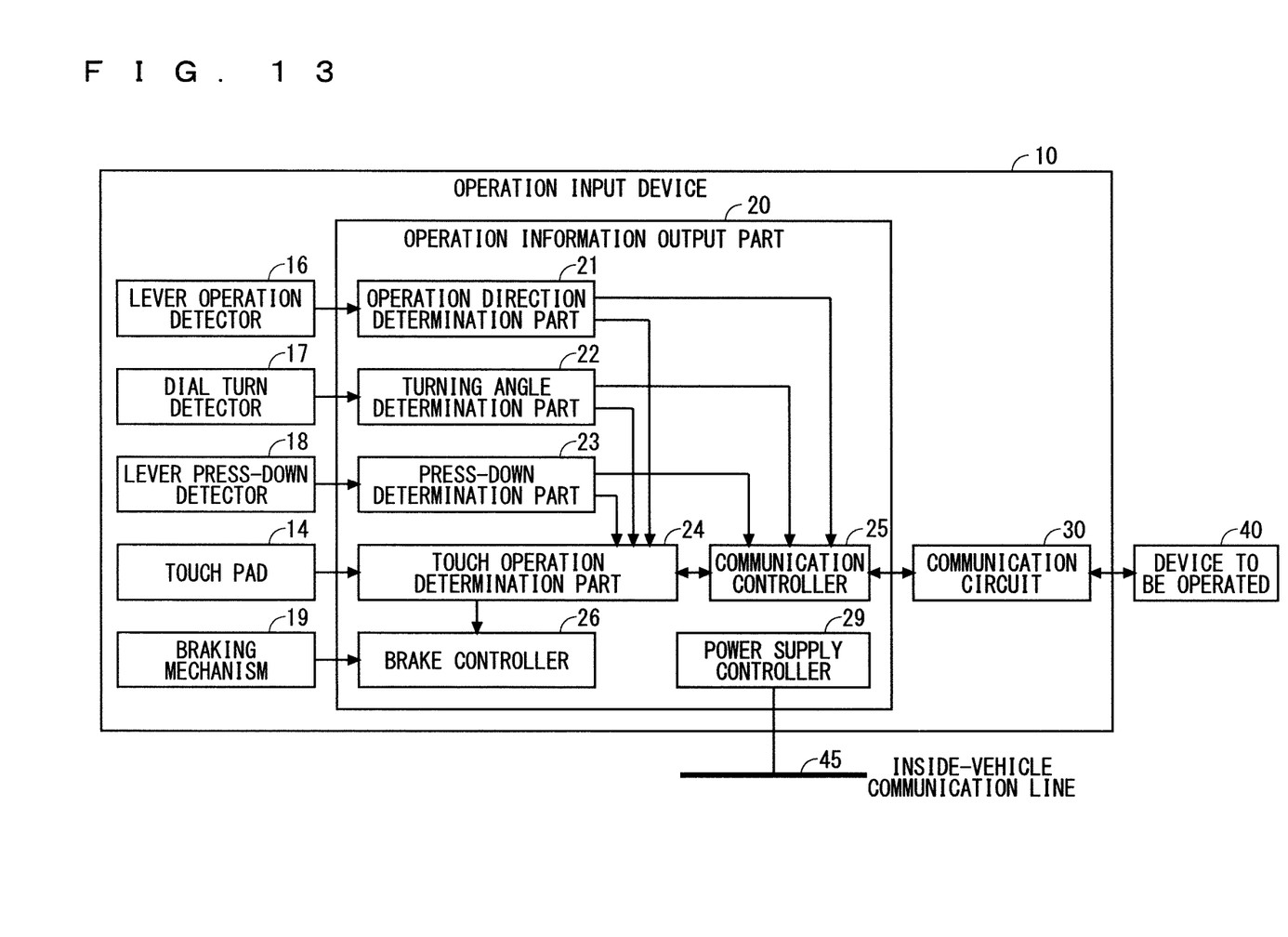
FIG. 13 is a diagram illustrating a configuration of the operation information output part of the operation input device according to a fourth embodiment.

FIG. 13 is a diagram illustrating a configuration of the operation information output part 20 in the operation input device 10 according to a fourth embodiment. In the operation information output part 20, a power supply controller 29 is added to the configuration of the first embodiment.

In the fourth embodiment, the operation input device 10 is installed in a vehicle. The power supply controller 29 is connected to an inside-vehicle communication line 45 of a vehicle installed with the operation input device 10, and operates so as to switch on or off of the power supply of the operation input device 10 at the time of detecting a particular vehicle signal (signal indicating a vehicle state). Here, the power supply controller 29 monitors a vehicle signal indicating the state of an ignition key of a vehicle, and then turns on the power supply of the operation input device 10 upon detecting a signal indicating that the ignition key has been turned on (ignition-on signal), and turns off the power supply of the operation input device 10 upon detecting a signal indicating that the ignition key has been turned off (ignition-off signal).

Figure 14:
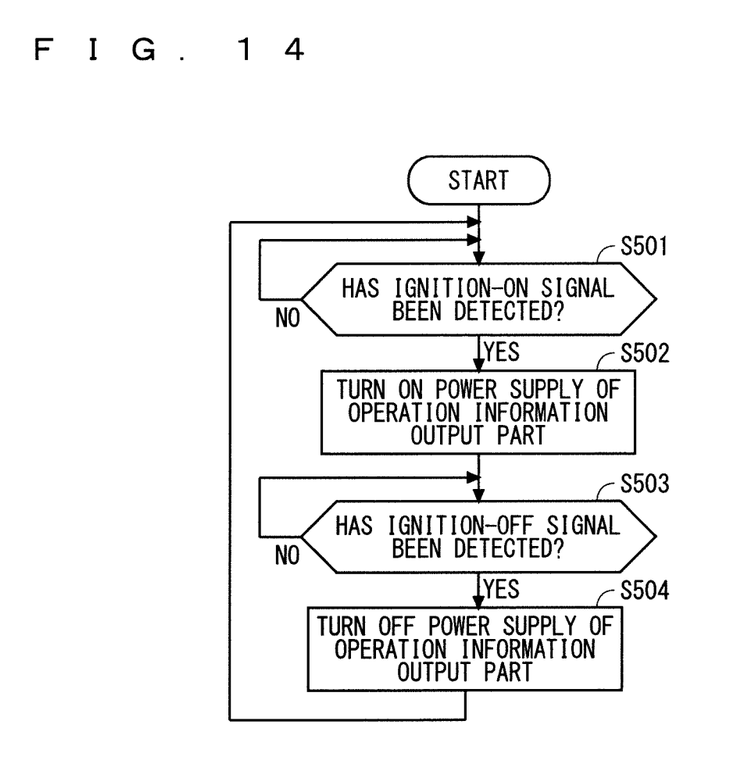
FIG. 14 is a flowchart illustrating an operation of a power supply controller.

FIG. 14 is a flowchart illustrating an operation of the power supply controller 29 according to this embodiment. The power supply controller 29 constantly monitors a vehicle signal on the inside-vehicle communication line 45, and firstly, waits for an ignition-on signal (Step S501). At the time of starting a vehicle, when an ignition-on signal is output to the inside-vehicle communication line 45, the power supply controller 29 detects the ignition-on signal (YES in Step S501), and then turns on the power supply of the operation information output part 20 (Step S502). After that, the power supply controller 29 waits for an ignition-off signal (Step S503). At the time of stopping the operation of the vehicle, when an ignition-off signal is output to the inside-vehicle communication line 45, the power supply controller 29 detects the ignition-off signal (YES in Step S503), and then turns off the power supply of the operation information output part 20 (Step S504).

According to this embodiment, turning on or off of the power supply of the operation input device 10 can be switched in accordance with an operation state of a vehicle, and hence power consumption in the operation input device 10 at the time of stopping the vehicle can be prevented, thus enhancing convenience.

Note that, in the present invention, each of the embodiments may be freely combined, and each of the embodiments may be modified or omitted as appropriate within the scope of the invention.

The present invention has been described above in detail, but the above description is in all aspects illustrative, and the present invention is not to be limited thereto. It is understood that unillustrated numerous modified examples are assumable without departing from the scope of the present invention.

EXPLANATION OF REFERENCE SIGNS 10 operation input device, 11 casing, 11a opening, 11b support member, 11c base, 12 lever, 13 dial, 14 touch pad, 15 spring member, 16 lever operation detector, 16a forward switch, 16b backward switch, 16c left switch, 16d right switch, 17 dial turn detector, 18 lever press-down detector, 19 braking mechanism, 19a brake disc, 19b brake pad, 19c brake pad, 20 operation information output part, 21 operation direction determination part, 22 turning angle determination part, 23 press-down determination part, 24 touch operation determination part, 25 communication controller, 26 brake controller, 27 timer, 28 reference information storage part, 29 power supply controller, 30 communication circuit, 40 device to be operated, 45 inside-vehicle communication line, 50 processing circuit, 51 processor, 52 memory

The invention claimed is:
1. An operation input device comprising:
a movable operation part moved by a user to be operated;
a touch pad disposed on the movable operation part, through which the user inputs a touch operation;
a touch operation determination part to detect a touch operation on the touch pad; and a brake that controls movement of the movable operation part while a touch operation on the touch pad is detected by the touch operation determination, part.

2. The operation input device according to claim 1, wherein the movable operation part comprises a dial.

3. The operation input device according to claim 1, wherein the movable operation part comprises a lever.

4. The operation input device according to claim 1, wherein the movable operation part comprises a push switch.

5. The operation input device according to claim 1, wherein the movable operation part comprises a lever that has, on top thereof, a dial installed with the touch pad, and that functions also as a push switch by being pressed down.

6. An operation input device comprising:
a movable operation part moved by a user to be operated;
a touch pad disposed on the movable operation part, through which the user inputs a touch operation; and
a processor configured to nullify a touch operation on the touch pad while a shift operation is performed on the movable operation part,
wherein the movable operation part comprises a lever that has, on top thereof, a dial installed with the touch pad, and that functions also as a push switch by being pressed down,
the movable operation part further comprises;
an operation direction determination part to detect a direction specifying operation that is a shift operation of the lever;
a turn angle determination part to detect a turn operation that is a shift operation of the dial; and
a press-down determination part to detect a press-down operation that is a shift operation of the push switch, and
wherein the processor nullifies a touch operation on the touch pad while any one of the direction specifying operation of the lever, the turn operation of the dial and the press-down operation of the push switch is detected.

* * * * *